United States Patent

Saari

[15] 3,651,350

[45] Mar. 21, 1972

[54] TEMPERATURE-COMPENSATED VOLTAGE SHIFTER

[72] Inventor: Veikko Reynold Saari, Matawan Township, Monmouth County, N.J.

[73] Assignee: Bell Telephone Laboratories, Incorporated, Murray Hill, N.J.

[22] Filed: Aug. 17, 1970

[21] Appl. No.: 64,323

[52] U.S. Cl. ..............................307/310, 307/237, 307/264, 307/297, 330/40

[51] Int. Cl. ........................................H03k 1/04, H03k 1/12

[58] Field of Search....................307/60, 213, 237, 270, 264, 307/296, 297, 310; 330/22, 40

[56] References Cited

UNITED STATES PATENTS

| | | | |
|---|---|---|---|
| 3,300,658 | 1/1967 | Slusher et al. | 307/297 |
| 3,259,761 | 7/1966 | Narud et al. | 307/317 X |
| 3,320,551 | 5/1967 | Miller | 307/310 X |
| 3,452,216 | 6/1969 | Hirsch | 307/215 |
| 3,022,457 | 2/1962 | Doan | 307/297 X |

*Primary Examiner*—Donald D. Forrer
*Assistant Examiner*—L. N. Anagnos
*Attorney*—R. J. Guenther and E. W. Adams, Jr.

[57] ABSTRACT

A voltage level shifter produces a shift in voltage level that is substantially independent of temperature variations. The voltage shift is made up of the $V_{BE}$ of a pass transistor and the voltage drop across a resistor connected between the collector and base of the pass transistor. The voltage drop across the collector-to-base resistor is maintained by a transistor current source whose output is dependent on the $V_{BE}$ of its transistors. The two transistors of the current source are chosen to have the same $V_{BE}$ temperature coefficient as the pass transistor, thereby substantially canceling the effects of temperature on the circuit except such as are introduced through the supply voltage.

6 Claims, 2 Drawing Figures

INVENTOR
V. R. SAARI
BY David P. Kelley
ATTORNEY

TEMPERATURE-COMPENSATED VOLTAGE SHIFTER

BACKGROUND OF THE INVENTION

This invention relates to DC voltage level shift circuits which provide a change in voltage level in order to match the output bias voltage level of one circuit with the input bias voltage level of another. More particularly, it relates to temperature stabilized voltage level shifters.

In many circuits it is desirable to change the average output voltage of one stage to a different level before applying it to the input of the succeeding stage. This is usually done to take advantage of the optimum bias conditions for each stage. However, sometimes it is done so that the outputs of various circuits will be the same, thereby allowing different combinations of the circuits to be used. This type of circuit is generally referred to as a voltage level shifter.

Prior art circuits for effecting DC level shifts include utilization of forward-biased diodes, Zener diodes, pi attenuators, and transistors having their collector-to-emitter voltage controlled directly by impedance ratios. The use of forward-biased diodes in level shifting is limited by the small fixed increments of voltage shift which can be achieved with a forward-biased diode and by its temperature dependence. The Zener diode is also limited to a fixed voltage shift and individual Zener diodes of a particular type may have relatively large variations in Zener voltage.

Resistive pi attenuators disclosed in the prior art provide level shift with little temperature or frequency dependence. The pi attenuator circuit also provides a continuously variable level shift. However, it attenuates the transmitted signal in providing the level shift and requires the use of an amplifier to restore the signal. A level shifter using a pass transistor with resistors connected between the collector and base, and the base and emitter of the pass transistor is disclosed by the prior art. The base-to-emitter resistor is made much less than the DC base-to-emitter resistance of the transistor, thereby causing a fairly constant current to flow through the collector-to-base resistor. The constant current produces a relatively constant voltage from collector to emitter, assuming the base-to-emitter voltage of the transistor is relatively constant. Through changes in the values of the resistors the voltage shift is made continuously variable. However, the voltage shift produced by the circuit is very dependent on the base-emitter temperature characteristics of the transistor.

SUMMARY OF THE INVENTION

The present invention is directed to reducing the problem of providing a continuously variable DC voltage level shift which is substantially independent of temperature. This is achieved by connecting a resistor from the collector to the base of a pass transistor and drawing a constant current through it. This constant current produces a constant voltage drop from collector to base. Since the base-to-emitter voltage of a normally biased transistor is substantially constant at a fixed temperature, a constant voltage drop across the transistor is achieved. The constant current drawn through the collector-to-base resistor is provided by a transistor current regulator whose output current is dependent on its supply voltage and the base-to-emitter voltage of one of its transistors. These transistors are erected on the same substrate as the pass transistor during the manufacture of integrated circuits or are selected to have the same $V_{BE}$ temperature coefficient as the pass transistor. Therefore, any change in the $V_{BE}$ of the pass transistor due to temperature will be compensated by a change in current and a corresponding change in collector-to-base voltage.

In an illustrative embodiment of the invention the collector-to-base resistor is connected to the collector of the first current regulator transistor. The emitter of this first current regulator transistor is connected to a voltage source and its base is connected through a resistor to the reference terminal. The base and collector of the second current regulator transistor are connected to the base of the first current regulator transistor and its emitter is connected to the emitter of the first current regulator transistor. When all the transistors have the same characteristics the current through the current regulator resistance is dependent on the supply voltage minus the $V_{BE}$ of the second regulator transistor and is nearly equal to the current through the collector-to-base resistor. Variations in this current are dependent on the temperature variations of the $V_{BE}$ of the second regulator transistor. If the temperature rises while the supply voltage stays fixed, the base-to-emitter voltage of all the transistors decreases and the currents through the current regulator resistor and the collector-to-base resistor increase. This increase in current in the collector-to-base resistor produces an increase in the collector-to-base voltage which compensates for the decrease in base-to-emitter voltage of the pass transistor, thereby keeping the level shift substantially constant with temperature.

The foregoing and other features of the present invention will be more readily apparent from the following detailed description and drawings.

DETAILED DESCRIPTION

Figure 1:
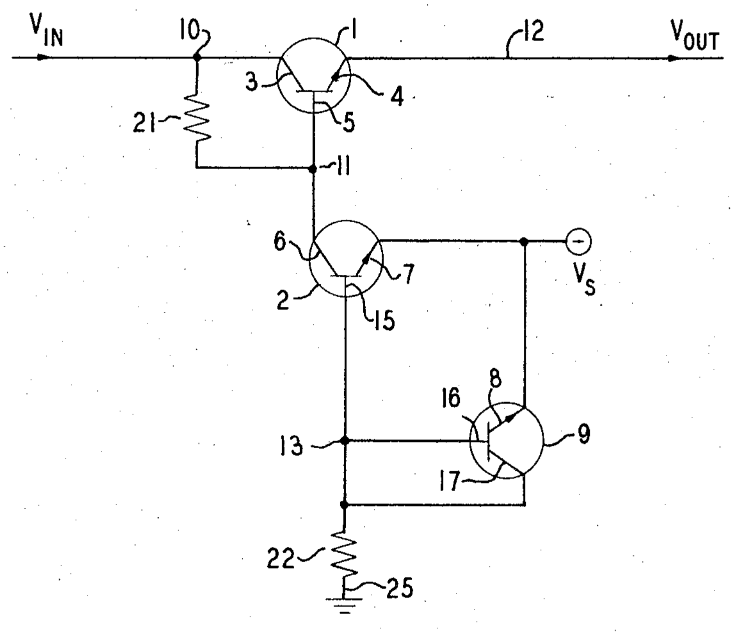
FIG. 1 is a schematic of an illustrative embodiment of the invention.

The circuit of FIG. 1 is a DC voltage level shift network illustrating the principles of the present invention. The input to the circuit is applied to terminal 10, which is connected to the collector electrode 3 of a transistor 1 and the output of the circuit is derived from terminal 12, which is connected to the emitter electrode 4 of transistor 1. Resistor 21 is connected from terminal 10 to terminal 11, which is connected to the base electrode 5 of transistor 1. The collector electrode 6 of a second transistor 2 is also connected to terminal 11. The emitter electrodes 7 and 8 of transistor 2 and a third transistor 9 are connected to negative voltage source, $V_S$ (not shown). The base electrodes 15 and 16 of transistors 2 and 9, respectively, and the collector electrode 17 of transistor 9 are connected to a terminal 13 which is connected to one end of resistance 22. The other end of resistance 22 is connected to the reference or ground terminal 25.

The current through resistance 22 is equal to $$(V_S - V_{BE})/R_{22}$$

If the transistors have high gain and their characteristics are similar, then the current through resistance 21 will be nearly the same as that through resistance 22. This occurs because the base-to-emitter voltage of transistors 2 and 9 are the same and therefore their emitter currents will be the same. This occurs because substantially equal current densities flow in emitter junctions placed in parallel, with only minor dependence on base-to-collector voltage. If the transistors have high gain, then the base currents can be ignored. Therefore, the current through resistance 22, which becomes the emitter current of transistor 9, and the current through resistance 21, which becomes the emitter current of transistor 2, will be the same.

The voltage level shift is made up of the base-to-emitter voltage of transistor 1 and the voltage drop across resistance 21, which is equal to the current through resistance 21 multiplied by its resistance. This makes the voltage level shift equal to $$V_{BE_1} + \left[\frac{V_S - V_{BE_9}}{R_{22}}\right] R_{21}$$

If $R_{21}$ is the same as $R_{22}$ and the $V_{BE}$'s are the same, the level shift is equal to $V_S$. The transistors may be selected to have equal characteristics or they may be formed on the same substrate during a manufacturing process, such as an integrated circuit arrangement.

From the above analysis it is seen that the circuit can be made to provide a stable voltage level shift which is substantially independent of the temperature effect of $V_{BE}$. Also, the amount of the level shift can be continuously controlled by changing the supply voltage, $V_S$, and is independent of the input voltage.

Figure 2:
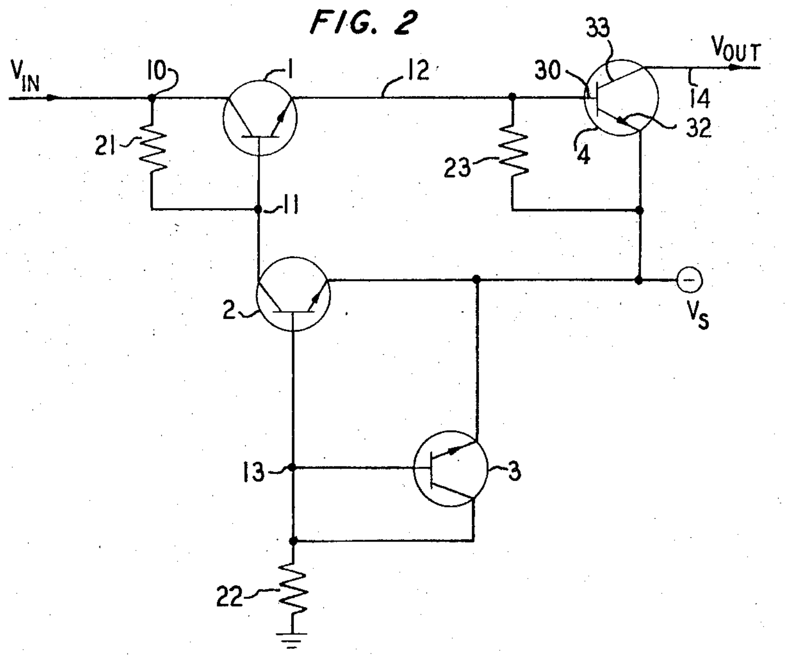
FIG. 2 is a schematic of an embodiment of the invention driving a transistor load.

FIG. 2 shows an embodiment of the invention driving a transistor which is to operate at a voltage different from the input. It shows terminal 12 connected to the base 30 of a transistor 31. The emitter electrode 32 of transistor 31 is connected to supply voltage, $V_S$, and the collector electrode 33 of transistor 31 is connected to the output terminal of the circuit 14. Resistor 23 is connected from base to emitter of transistor 31 and supplies a path for the emitter current of transistor 1. With this arrangement the driving point voltage is fixed at $$V_{in} = -V_S + 2\ V_{BE} + [(V_S - V_{BE})/R_{22}]\ R_{21}$$

If $R_{21} = R_{22}$, then $V_{in} = V_{BE}$. Note that any variations of the supply voltage $V_S$ are effectively masked from the driving point. If a diode is added in series with resistance 22, then the driving point bias voltage will be equal to zero. This circuit is useful where the driving source has a relatively small voltage swing. The invention may be used in an integrated circuit operational amplifier in which the following are typical values:

$V_{BE} = 0.7$ volts
$V_S = 3.5$ volts
$R_{21} = R_{22} = 2{,}000$ ohms
$R_{23} = 1{,}500$ ohms The foregoing embodiments of the principles of the invention are for the purpose of illustrating those principles. Those principles involve the use of a base-emitter junction voltage of a transistor and a resistor with a constant current through it connected from collector to base of the transistor as a voltage level shifter. The output of the constant current source is a function of the base-emitter voltage of its transistors and can be made to cancel the effect of temperature changes in the level shifter.

Certain of the principles of the present invention are shown as utilized in a voltage level shift circuit in the copending U.S. Pat. application of F. D. Waldhauer, Ser. No. 32,050, filed Apr. 27, 1970. The circuit therein depicted uses a constant current source to develop a reference voltage across a resistance. This voltage is compared in a differential amplifier to the voltage across the pass or regulator transistor which provides the level shift. The pass transistor voltage is then adjusted to equal the reference voltage. In the Waldhauer circuit the current source is presumed to be constant with respect to temperature while the present invention depends on the temperature variation of the current source to compensate for the temperature variation in the $V_{BE}$ of the pass transistor.

What is claimed:

1. A voltage level shift circuit having an input, an output, and reference terminal comprising:
- a pass transistor exhibiting a substantially constant voltage shift between said input and output terminal and having its collector-emitter path connected between said input and output,
- a first resistance connected between the collector and base of said pass transistor, and
- a means for compensating the temperature variation of the base-emitter voltage of said pass transistor comprising a constant current source connected between the base of said pass transistor and said reference terminal, said constant current source having a temperature characteristic such that its output current varies in response to temperature variations in such a manner as to substantially eliminate the effect of the temperature variations in the voltage level shift.

2. A circuit as claimed in claim 1 wherein said constant current source comprises:
- a first transistor having its collector connected to the base of said pass transistor and its emitter connected to a voltage source,
- a second transistor having its collector and base connected to the base of said first transistor and its emitter connected to said voltage source,
- a second resistance connected between the base of said first transistor and said reference terminal.

3. A circuit as claimed in claim 2 wherein the current source transistors have substantially the same $V_{BE}$ temperature characteristics as the pass transistor. V

4. A circuit as claimed in claim 2 wherein said first resistance is different from said second resistance and the voltage level shift is substantially equal to said voltage source multiplied by a first quantity equal to the ratio of the first resistance to the second resistance; plus the $V_{BE}$ of the pass transistor multiplied by a second quantity equal to one minus the ratio of the first resistance to the second resistance.

5. A circuit as claimed in claim 3 wherein said second resistance is equal to said first resistance, thereby producing the optimum cancellation of temperature effects on the voltage level shift.

6. A circuit as claimed in claim 2 in combination with a third transistor having its base connected to the output of the circuit of claim 2, its emitter connected to said voltage source, and its collector forming the output of the combination, thereby effectively masking variations of the voltage source from the input terminal.

* * * * *